United States Patent Office 2,997,343
Patented Aug. 22, 1961

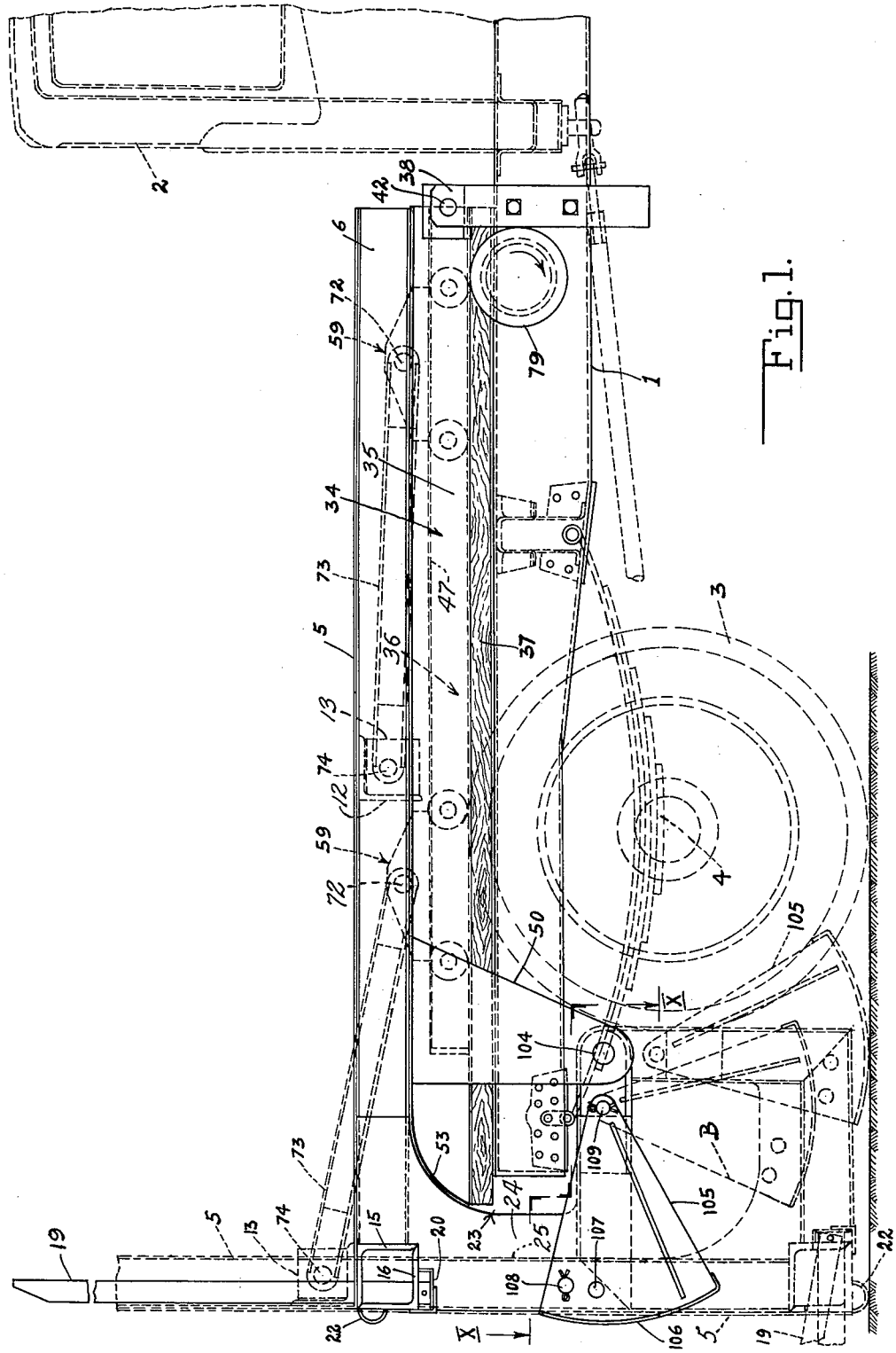

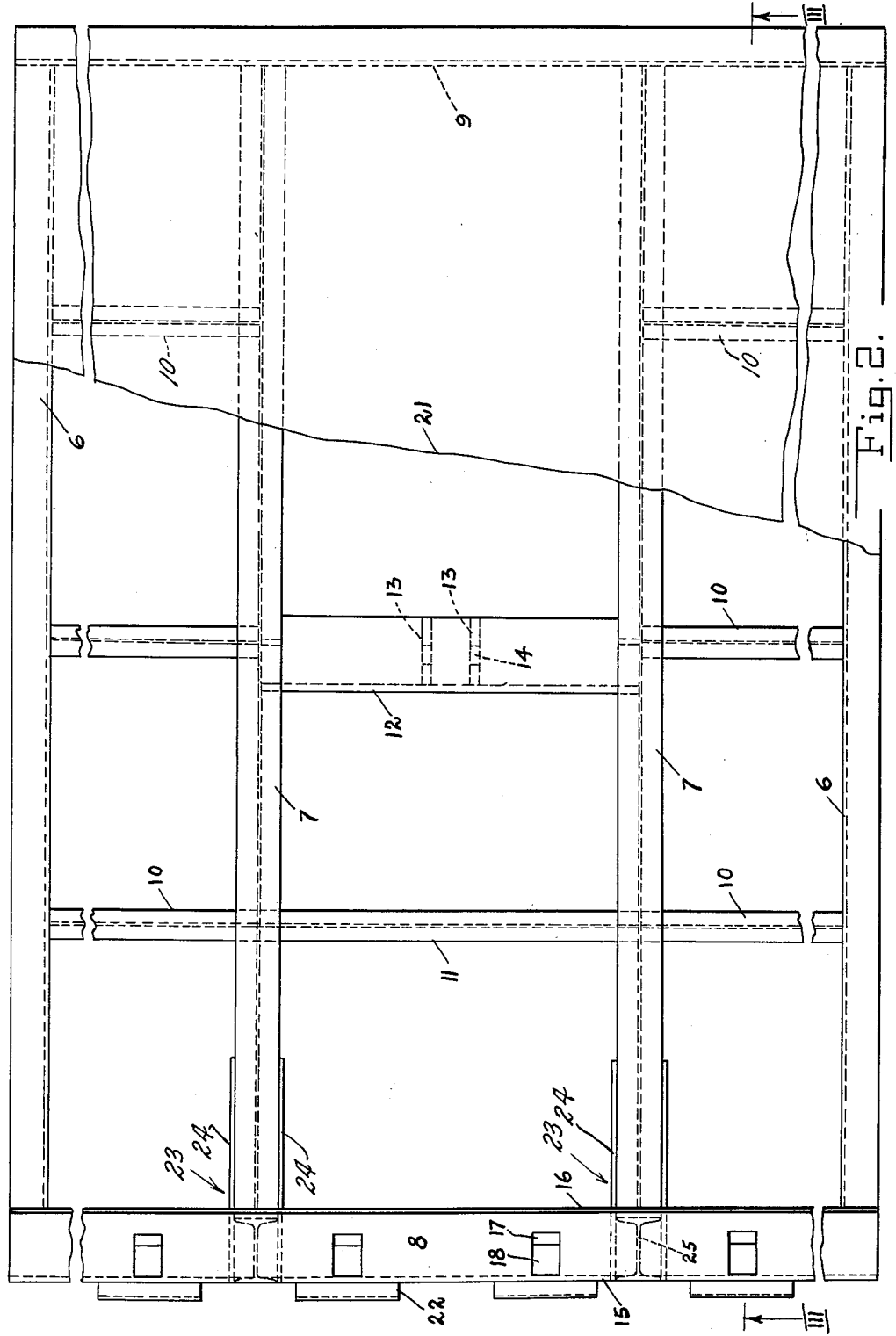

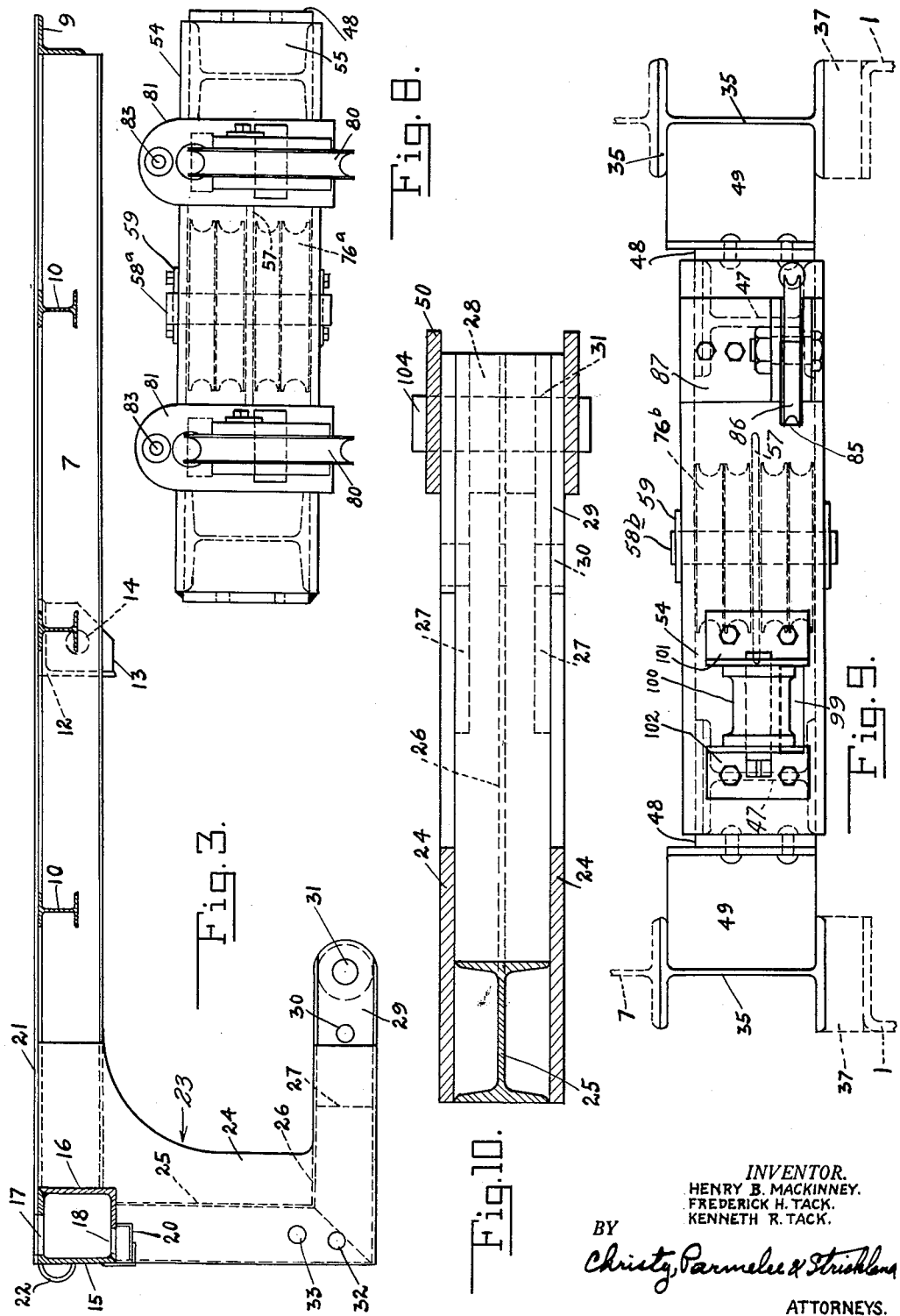

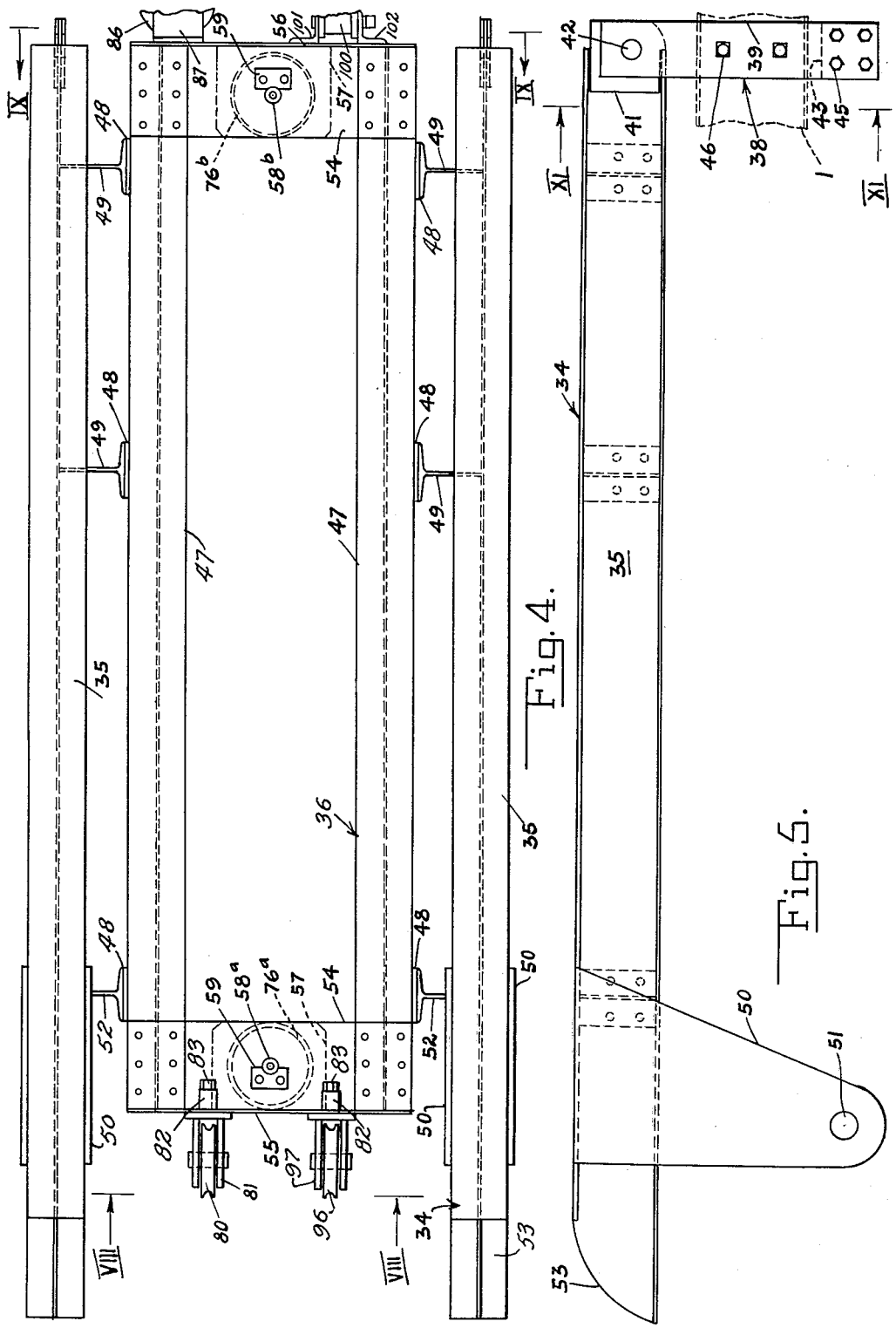

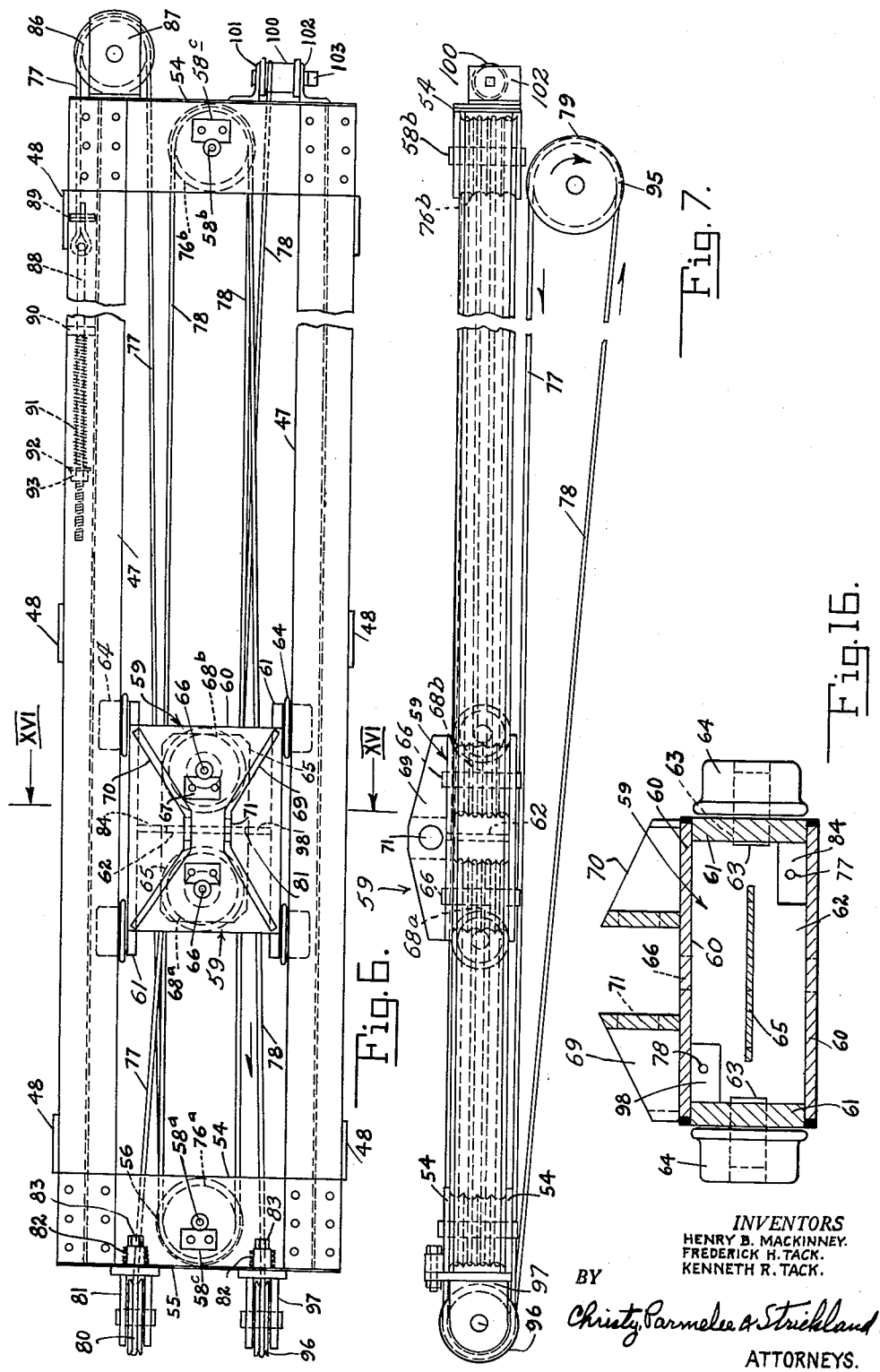

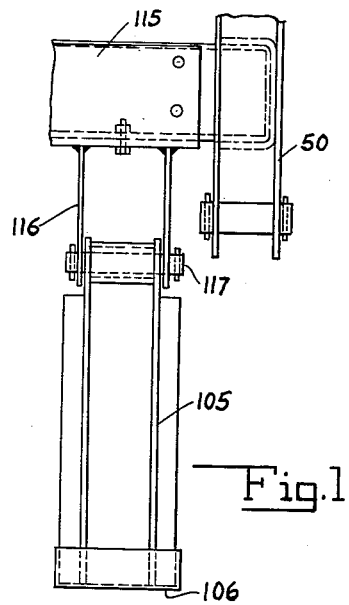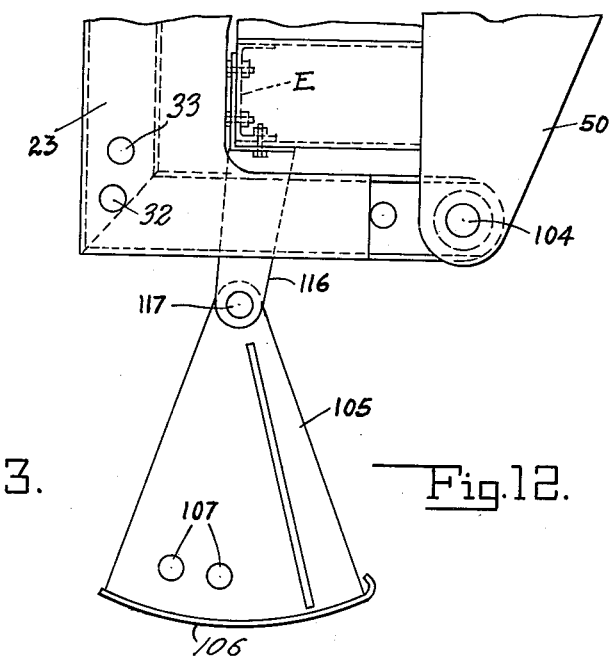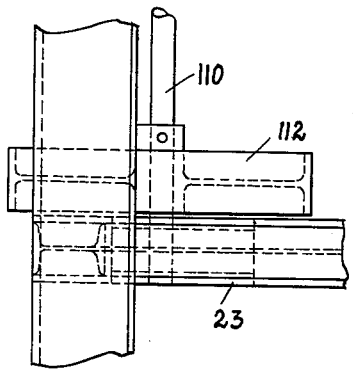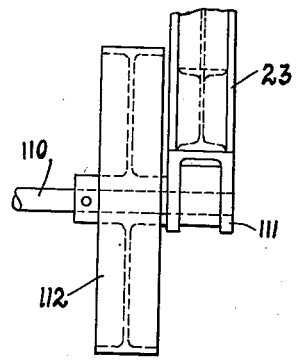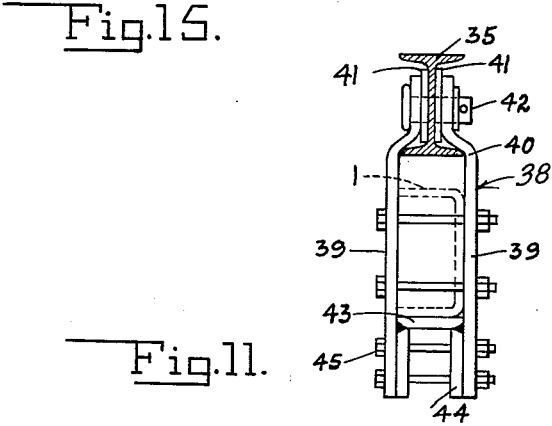

2,997,343
DUMP TRUCK WITH A PERPENDICULARLY TILTABLE DUMP BODY
Henry B. MacKinney, Frederick H. Tack, and Kenneth R. Tack, Butler, Pa., assignors to John Tack & Sons, Butler, Pa., a partnership
Filed Feb. 24, 1956, Ser. No. 567,504
10 Claims. (Cl. 298—19)

This invention pertains in general to motor vehicle dump bodies and more specifically to the manner of supporting and tilting the body about the vehicle chassis through an angle of substantially 90° to facilitate loading and unloading of the vehicle body.

The use of road vehicles provided with dump bodies is old in the art and includes bodies provided with bottom opening doors as well as bodies mounted upon the vehicle chassis for pivotal movement about one end of the chassis. Recently it has been recognized that substantial advantages would flow from the provision of a road vehicle having a body which upon tilting through an arc of substantially 90° could deposit the load within the body upon the ground and intact, instead of discharging the load over the end of the body spaced a substantial distance above the ground.

The construction and use of such a tilting body upon a motor vehicle chassis has presented a number of difficult problems. Due to the large angle of movement of the body from load carrying position to dumping position, the body tilting mechanisms have become quite cumbersome, complicated and expensive. A further difficulty found with such dump bodies is that the wheels of the vehicle are not always supported on solid ground during tilting of the body and the wheels may sink into the ground thus reducing the clearance between the ground and the end of the tilting body, causing interference with the free tilting movement of the body.

One object of the present invention is to provide a novel simplified form of power actuated body tilting mechanism which may be interchangeably mounted upon a standard motor vehicle chassis.

Another object of the invention is to provide a vehicle tilting body with a sub-frame adapting the body for mounting upon a standard vehicle chassis.

A further object of the invention is to provide a novel and efficient mounting of the body upon the sub-frame, independently of the vehicle chassis, and to provide on the tilting body a sub-support compensating for inequalities in the ground surface at the bearing of the vehicle wheels at the point of discharge of the load within the body.

These and other objects will be made apparent from the following description and from the drawings forming part thereof, wherein:

FIG. 1 shows a side elevation of the motor vehicle with the body in load receiving position and by dot and dash lines the position of the body in fully tilted position;

FIG. 2 shows a plan view of the body with portions of the floor removed;

FIG. 3 shows a section through the body on lines III—III of FIG. 2;

FIG. 4 shows a plan view of the sub-frame assembly;

FIG. 5 shows a side elevation of the sub-frame assembly;

FIG. 6 shows a plan view of the trolley assembly of the sub-frame;

FIG. 7 shows a side elevation of the trolley assembly;

FIG. 8 shows an end elevation of the trolley assembly at lines VIII—VIII of FIG. 4;

FIG. 9 shows an elevation of the sub-frame assembly at lines IX—IX of FIG. 4;

FIG. 10 shows a section on lines X—X of FIG. 1;

FIG. 11 shows a section on lines XI—XI of FIG. 5;

FIG. 12 shows a side elevation of outrigger assembly;

FIG. 13 shows an end elevation of FIG. 12;

FIG. 14 shows a modified form of rocker arm of FIG. 1;

FIG. 15 shows end elevation of rocker arm of FIG. 14; and

FIG. 16 shows a section through the trolley assembly on lines XVI—XVI of FIG. 6.

Referring now in detail to the drawings, the dump body and body tilting mechanism are shown mounted upon a suitable motor vehicle having the usual chassis 1, cab 2, rear wheels 3 and spring suspension 4. The vehicle is also to be provided with the usual driving mechanism including motor, drive shaft, differential, etc. (not shown). The dump body may be of any suitable design for the intended use thereof, that shown herein and indicated generally by reference character 5 is a modified type of stake body for hauling concrete blocks and other stacked materials. The body 5 is comprised of two laterally spaced longitudinally disposed side members 6, two similarly spaced and disposed center members 7 and end sill members 8 and 9. Intermediate the ends of the body members are suitably connected cross bracing members such as 10 and 11. Also intermediate the ends of the body members 7 is a body tilting mechanism connecting member which may be of suitable form, such as the angular member 12 having its opposite ends connected with the members 7 and intermediate the ends thereof adjacent the center line of the body provided with spaced brackets 13 having openings 14 therein. The end sill member 8 is preferably reinforced and for this purpose is shown as a box girder comprised of the angles 15 and 16. Spaced longitudinally of the end sill member 8 and in the upper and lower flanges thereof are a plurality of the aligned openings 17 and 18 for reception of the body standards 19. Suitable supports 20 for such standards are attached to the underside of the opening 18 in the end sill 8. The opening 17 in the top of end sill 8 is larger than its aligned corresponding opening 18 to provide some flexibility in the standards 19 as hereinafter discussed. A suitable floor plate 21 is secured to the members 6, 7, 8 and 9. Spaced longitudinally of the outer face of the end sill 8 may be provided an arcuate member or members such as the semi-circular members 22. These may be attached to the end sill member 8 by any suitable means such as welding.

Body tilting support means, such as trunnions 23 are connected to one end of the body members 7 and beneath the end sill 8. These members 23 may be of any suitable construction and are shown in the drawings, FIGS. 1 and 3, as comprised of substantially C-shaped plates 24 secured to opposite sides of one end of each member 7 and to the members 25 and 26 of similar cross section. The portion of the member 26 extending beyond the plates 24 may be suitably reinforced by the members 27 secured between the flanges of member 26 and to the plate 24. Between the members 27 and web of member 26 at the outer end thereof are the members 28. Members 28 form an extension of plates 24. Suitable openings 30 and 31 are formed through the members 26, 27 and 28 for purposes hereinafter to be discussed. Suitable openings 32 and 33 are also formed in the members 24 and 25 for a purpose hereinafter to be discussed.

Between the vehicle chassis 1 and the body 5 is a body mounting means referred to herein as a subframe indicated generally by the reference character 34, FIGS. 1, 4 and 5. The subframe is comprised of two side members 35 spaced to correspond to the transverse spacing of the longitudinal members of the chassis 1 and are connected by a trolley assembly 36. The ends of members 35 at the rear of the vehicle are shaped, as at 53, to clear the body trunnions 23. A wooden lining member 37 may be disposed between the members 35 and the chassis members for the dual purpose of absorbing shocks to the chassis and providing for adjustment due to variations in the relative depth of the vehicle chassis members should the body be shifted from one vehicle chassis to another. This sub-frame 34 is anchored at one end to the truck chassis 1 by any suitable means such as the yokes 38 secured at one end to each sub-frame member 35 and to the adjacent chassis frame member. As shown in FIGS. 5 and 11 the yoke 38 comprises two spaced hanger members 39 having their upper ends offset inwardly at 40 so as to overlie the web of the I-beam forming the member 35. The bottom flange of member 35 may be cut to receive members 39 and the web of member 35 reinforced by plates 41. The plates 41 are secured to the member 35 by any suitable means such as welding. The members 39 of yoke 38 are connected to the member 35 at plates 41 by any suitable pin such as 42. The members 39 lie on each side of each of the chassis frame members and extend beneath same. Beneath each chassis frame member and between the members 39 is a substantially U-shaped member comprised of a web 43 bearing against the underside of the chassis frame member and side portions 44 bearing against the opposite yoke members 39. Suitable aligned openings are then formed in the members 39 and 44 for the reception of bolts 45 locking the subframe to the vehicle chassis. Bolts 46 may extend through the chassis member and yoke 38 to retain the latter in fixed relation on the chassis when as hereinafter set forth the sub-frame may pivot on pin 42. Means forming a pivotal support for the body is also part of the subframe and shown as the plates 50.

The trolley assembly 36, FIGS. 4, 8 and 9, is provided with spaced side members 47 of suitable design and which are shown herein as I-beams which are suspended in any suitable manner from the sub-frame members 35 as by the plates 48 extending between the flanges of the members 47 and a member 49 connected to each plate 48 and to the web of the member 35 by any suitable means such as welding or riveting. Adjacent the rear end of the sub-frame are the body trunnion support members 50 which lie on opposite sides of the member 35 and are secured to the flanges thereof by any suitable means such as welding. Adjacent the lower ends of each pair of the members 50 are aligned openings 51 for a purpose hereinafter to be set forth. The adjacent end of the trolley assembly is connected to the sub-frame members 35 by the plates 48 and member 52 extending between the plate 48 and the adjacent member 50 and secured thereto by any suitable means such as welding. Each end of the trolley assembly is enclosed by suitable plate members 54 secured to the top and bottom flanges of the members 47. End plates 55 and 56 connect the pair of members 54. At each end of the trolley assembly and extending on opposite sides of the center line thereof is a spacing member 57 secured to each member 55 and 56 and extending inwardly between the plates 54. At the center line of the assembly at each end thereof, between the members 54, are a plurality of sheaves 76a and 76b, two of which are mounted above the spacing member 57 and two of which are mounted below the spacing member 57. These sheaves are held in place and rotate upon the shafts 58a and 58b extending through the sheaves and the plates 54. These shafts may be secured to the members 54 at opposite ends thereof by any suitable means such as the locking plates 58c secured to the members 54 and extending into a suitable notch in the adjacent portion of the shafts 58a and 58b.

As best shown in FIGS. 1, 6 and 7 a trolley 59 is mounted on the members 47 of the sub-frame. The trolley 59 is comprised of the top and bottom members 60 integrally connected with the side members 61 as by welding. Intermediate the ends of the members 61 is a cross brace 62. Adjacent the ends of each member 61 are mounted stub axles 63 upon which are rotatably mounted the flanged wheels 64 supported on the bottom flanges of the members 47. Intermediate the members 60 and secured to the opposite sides of the members 62 so as to extend outwardly therefrom are the spacing members 65. Aligned openings are formed in the members 60 and 65 for reception of the shaft 66 held in place by suitable locking plates 67. Rotatably mounted upon the shaft 66 above and below the spacers 65 are pairs of sheaves 68a and 68b. Disposed upon the top surface of the upper plate 60 of the assembly 59 are the bracket members 69 and 70, secured to the member 60 by any suitable means such as welding. Aligned openings 71 are formed in the members 69 and 70 for reception of pin 72. As best shown in FIG. 1 of the drawing a dipper stick 73 has one end thereof pivotally connected by means of the pin 74 with the member 13 of the body. The opposite end of the dipper stick 73 is connected by means of the pin 72 to the aligned openings of the members 69 and 70 of the trolley.

The tilting and righting of the body is effected by reciprocal movement of the trolley 59 by means of the cables reeved about the sheaves 68a and b and 76a and b as best shown in FIGS. 6 and 7 of the drawings. The cables operating the trolley are two in number designated as the crowd lead cable 77, the hoist lead cable 78. As best shown in FIGS. 1 and 7 of the drawings a hoist drum 79 is mounted in any suitable manner between the members of the vehicle chassis 1 and is driven in opposite directions by suitable means (not shown) connected with the vehicle motor and the controls for which are mounted in the vehicle cab. The crowd lead cable 77 controls movement of the body from horizontal to dump position and the hoist lead cable 78 controls return of the body from dump to horizontal position. One end of crowd lead cable 77 is connected to hoist drum 79 and extends rearwardly therefrom beneath the sub-frame and upwardly over the pulley 80 mounted in the bracket 81 secured to the adjacent member 82 upon member 54 by bolt 83. The cable 77 then extends inwardly of the sub-frame assembly where it is reeved in turn about the top sheave 68a thence back to the top sheave 76a, thence to a second lower sheave 68a and so forth until the cable passing around the bottom sheave 76a on the shaft 58 extends forwardly of the vehicle through the opening 84 in the member 62 of the trolley to the front end of the sub-assembly where it passes through opening 85 of the member 54 where it is trained about the sheave 86 mounted in the bracket 87 secured to the adjacent member 54 of the sub-assembly. Cable 77 after passing over sheave 86 extends inwardly and rearwardly of the sub-assembly where it is looped through the eye bolt 88 and secured in place by the clamps 89. The eye bolt 88 in turn is mounted in a bracket 90 secured to the web of the adjacent member 47 and held in place by means of the compression spring 91, washer 92 and nut 93 on the shank of the eye bolt 88. The hoist lead cable 78 is mounted on the hoist drum 79 at 95 and at the opposite end of the drum 79 in the well known manner. Hoist lead 78 extends rearwardly of the vehicle beneath the sub-frame and upwardly over the sheave 96 mounted in the bracket 97 pivotally connected with member 82 mounted on member 54. Hoist lead 78 extends forwardly of the vehicle through the opening in the adjacent member 55 and opening 98 in member 62 of the trolley to the bank of sheaves 76b mounted on the shaft 58b. Here the cable 78 is first passed around the top sheave 76b, thence rearwardly to the top sheave 68b of the trolley, thence forwardly to the second sheave 76b and back to the second sheave 68b and so forth until as the cable 78 moves off the bottom sheave 68b it moves forwardly of the sub-assembly through opening 99 of member 54 and is secured in a becket spool 100 which in turn is rotatably mounted in the brackets 101 and 102 secured to the adjacent subframe member 54. The end of the becket spool 100 adjacent the bracket 101 has ratchet teeth about the periphery thereof and a dog (not shown) is mounted on the bracket 101 for engagement with the ratchet teeth permitting rotation of the becket spool in one direction only. The opposite end of the becket spool has a squared end 103 to receive a wrench for rotating the becket spool.

Referring now to FIGS. 1 and 6 of the drawings it will be noted that the vehicle body in moving from horizontal to dump position traverses an angle of about 90°, and that the connection between the dipper stick 73 and the body through the pin 74 is substantially in the vertical plane of the center of gravity of a uniform load on the body. It will also be noted that the body trunnion 23 is pivotally connected to the sub-assembly through the pin 104 outwardly and below the connection between the dipper stick and the body in horizontal position. By reason of this construction the center of gravity of the tilting load passes outwardly of the pivot pin 104 before the load is completely dumped and that the deflection of the truck spring has passed a maximum before the body moves into fully tilted position. To assist the body in moving into and out of fully dumped position and also to avoid longitudinal displacement of the vehicle during this period we propose to mount a rocker member 105 on the body trunnion as shown. This member 105 may be substantially in the shape of a segment of a circle having an arcuate ground engaging face 106 and pivotally mounted on the body trunnion 23 outwardly of the body trunnion turning axis by means of pin 109 when the body is in horizontal position. If desired, the member 105 may have a plurality of spaced apertures 107 therein and by use of a pin 108 engaging corresponding apertures 32, 33 in the body trunnion 23 the member 105 may be held in elevated position during transportation of the vehicle as shown in FIG. 1 of the drawing. When it is desired to tilt the body 5 to fully dumped position, the pin 108 may be withdrawn and the member 105 permitted to depend from its pivot pin 109 as shown in dotted lines on FIG. 1 of the drawing. The member 105 being freely pivoting on the pin 109 will maintain a substantially vertical position as the body moves from horizontal to dump position, so that should an obstruction be present on the ground which might be engaged by the body trunnion as the body moves into fully dumped position, the member 105 would first engage such obstruction and acting through the body pivot support 42 would tend to lift the rear end of the body. Due to the arcuate shape of portion 106 of member 105 rocking on the pivot pin 109 the body 5 is permitted to move into fully dumped position without damage to the body or its mounting upon the vehicle. Conversely as the body moves from fully dumped to horizontal position the member 105 by reason of its arcuate face 106 will permit a slight rocking of the body trunnion as the body moves out of engagement with the ground. To the left of FIG. 1 is illustrated the permissible vertical movement in the body standard 19 in the case of their striking an obstruction as the body tilts to dump position. Where it is desirable to run the body standards 19 beneath a pallet in picking up a palleted load such vertical movement of the body standards 19 is of advantage in clearing. In FIGS. 14 and 15 of the drawings is shown a modified form of the member 105. In this view an axle 110 is mounted in suitable journals 111 secured to the underside of the body trunnion 23 when in horizontal position as shown. Mounted on the axle 110 and between the body trunnions 23 are the wheels 112. Preferably the underside of the tread of wheels 112 have a ground line clearance substantially the same as the clearance between the ground and the truck differential so that the wheels 112 will clear any obstruction which would be cleared by the truck differential.

A further modification in location of rocker member 105 is shown in FIGS. 12 and 13 of the drawings whereby in a member 115 or other suitable reinforcement may be provided for the end member E of the chassis. Between the body trunnions 23 and secured to member 115 are spaced pairs of bracket members 116. Between each pair of brackets 116 may be mounted a rocker member 105 upon pins 117. When handling extremely heavy loads the rocker members 105, in this position, limit deflection of the vehicle chassis by engagement with the ground. By proportioning the length of rocker 105 from the center of pin 117 to the bottom of rocker 105 equal to or greater than the distance from the center line of body fulcrum shaft 104 outwardly to the extreme end of the body members 22 the body 5 can always move into fully dumped position.

The operation of the vehicle will be readily understood upon reference to FIGS. 1, 6 and 7 of the drawings. As shown by full lines on FIG. 1, the vehicle is positioned for tilting of the body through an angle of 90° to deposit the load within the body upon the ground. With the vehicle brakes set to hold the vehicle against moving, the member 105 may be released by removal of pin 108 for free vertical swinging motion in the position indicated in dotted lines marked B of FIG. 1. The trolley 59 will be in the position indicated by dotted lines to the right of FIG. 1. The crowd line 77 and the hoist line 78 are wound upon power winch 79 in the usual manner so that line 77 is taken up and hoist line 78 is released from the hoist drum 79 when rotated in the direction of the arrow in FIG. 1 and line 77 is released and hoist line 78 taken up by the drum 79 when rotated in the opposite direction. The trolley 59 is moved from right to left of FIG. 1 in tilting the body to dump position and from left to right in righting the body to load carrying position. The winch drum may be powered from the vehicle engine by any suitable means with controls therefor within the cab of the vehicle, or it may be actuated manually by a hand crank.

The winch drum 79 of FIG. 1 is now rotated in the direction of the arrow to take up crowd line 77 moving trolley 59 from right to left. The dipper stick 73 pivotally connected to the trolley by pin 72 and to the body by pin 75 is actuated by the trolley to rotate the body from right to left upon the under-frame trunnions 23 supported in member 50 of the sub-frame upon pin 104. The stakes 19 at the left end of the body retain the load in fixed relation to the body during dumping. During movement of the trolley 59 from the position on the right to that of the left in FIG. 1, the body moves to fully dumped position as shown by dotted lines in FIG. 1. In such cases as where the ground is level the members 105 and the members 22 of the body will engage the ground or platform level simultaneously. If the load within the body is deposited upon suitable supports the vehicle can be moved forward to remove body stakes 19 from beneath the load and the body returned to righted position. To right the body, the hoist drum 79 is rotated in a direction opposite to that shown by the arrow of FIG. 1 to take up the hoist line 78 and simultaneously pay out the crowd line 77 in moving the trolley 59 from left to right in FIG. 1. During this latter movement of the trolley the dipper stick 73 acts on the body to return it to horizontal load carrying position upon the vehicle sub-frame member 35.

The vehicle is not always supported upon a level firm support during dumping. Thus the vehicle wheels may be disposed in a depression during dumping or supported upon soft ground causing the wheels to sink into the ground, or there may be an obstruction in the path of movement of body trunnion 23 as the body moves to dump position. In each such case the body would not be permitted to move freely to dump position and upon continued operation of winch drum 79 the body, operating mechanism or trunnion supports would be damaged. The members 105, pivotally mounted upon the body trunnion members 23, acting in combination with the yokes 38 prevent such damage.

In FIG. 1 of the drawings the member 105 is maintained in substantially horizontal position by pin 108 when the vehicle is in transit. When about to tilt the body to dump position, the member 105 is preferably released, by removal of pin 108, so as to freely pivot in vertical position upon the pivot support 109 adjacent the body pivotal support 104. In this position the member 108 has only vertical downward movement, concurrent with tilting of the body, so as to have first engagement with an obstruction which would impede free dumping movement of the body. Should the base 106 of member 105 strike an obstruction, the arcuate face 106 thereof would rock to accommodate the inward movement of the pin 104 on body trunnion 23. The upward thrust on body trunnion 23 from member 105 would be transmitted through body trunnion 23 to the sub-frame trunnion member 50 and the sub-frame. The adjacent end of the sub-frame is free to move upwardly while pivoting on pin 42 connecting the sub-frame with yoke 38 adjacent the cab 2 of the vehicle. Such upward movement of the adjacent end of the sub-frame would carry with it the body 5 and provide sufficient clearance for body trunnions 23 to move under the adjacent end of the sub-frame without disturbing the normal relative positions thereof. When the body is returned to horizontal position the reverse movement of that described would take place.

A modified form of member 105 is shown in FIGS. 14 and 15 wherein an axle 110 is journaled in members 111 to connect the two body trunnions 23 and wheels 112 are mounted on the axle. The wheels 112 upon contact with the ground move freely inwardly of the vehicle to permit full tilting of the body in the manner previously described. In the case of the wheels engaging an obstruction they could continue to rotate by raising the adjacent end of the sub-frame as previously described.

The vehicle construction so far described is very flexible in regard to the character of materials handled and in the manner of loading and unloading. The stake body of FIG. 1 may be provided with side as well as end stakes. Such bodies can handle all manner of solid bulk or stacked materials. The stacked materials can be palletized and the body can be loaded by first tilting the body to dump position, then backing the vehicle to place the end stakes beneath the pallet and righting the body with the floor thereof in engagement with the load. The load in such cases would be held in place by engagement between the end stakes and the pallet. In the same manner stacked bricks, concrete blocks and similar materials may be handled. In the case of large flat structural items such as wood and composition wall panels, structural window frame and similarly shaped items may be palletized as before, or may be stacked directly onto the tilted body. In this manner factory and warehouse handling in loading would be simplified and the entire stack can be discharged as a unit at destination. This materially reduces labor charges, increases the productivity of each truck by decreasing the trip time and reduces breakage due to handling.

A further modification in vehicle construction is shown in FIGS. 12 and 13 of the drawing. Here a structure similar in function to an additional body support is mounted at the end of the vehicle chassis. These may be the members 105 provided for the previously described purpose. As shown, these members 105 are removed from the body trunnions 23 and pins 109 used to fasten them to brackets 115. The vehicle can then be used to load and unload heavy concentrated loads such as machinery or heavy stacked materials. Such loads would normally have a tendency to overbalance the vehicle when raised from the ground with the body in dump position as aforesaid. The result would be for the body to pivot about the rear axle and raise the vehicle front end from the ground. In FIGS. 12 and 13 however, the members 105 would resist this turning movement by providing vertical support for the rear end of the chassis. The body tilting and righting mechanism, in loading and unloading, will then function to manipulate the body and load in the manner previously described.

Having thus described the invention and specifically illustrating a presently preferred embodiment thereof it will be obvious to those skilled in the art that many details of construction of the invention can be readily modified without departing from the spirit of the invention as disclosed herein, for these reasons it is to be understood that any specific details of construction shown and described are for the purposes of illustration and not limitation except as may be made necessary by the scope of the appended claims.

We claim:

1. In a vehicle having a load carrying body tiltable about one end of the vehicle, in combination, a vehicle chassis, a load receiving body overlying said chassis when in load carrying position, means movably mounted on said chassis and disposed beneath said body providing support for the body upon said chassis, said body having a portion extending rearwardly of said means and the adjacent end of the chassis, means connected with said chassis mounted means and depending therefrom inwardly of the end of the chassis beyond which said body portion extends, means rigidly mounted on said rearwardly extending body portion and depending therefrom in overlapping spaced relation to the adjacent end of said chassis, said depending body mounted means having a portion extending forwardly beneath said body in overlapping relation to said chassis connected means and a pivotal connection between said overlapping means about which the body turns in tilting about the adjacent end of the said vehicle chassis, and means for imparting tilting movement to said body.

2. The vehicle as defined in claim 1, wherein the means movably mounted on said chassis beneath said body providing support for the body upon said chassis comprises a sub-frame having portions overlying and supported by said chassis, said sub-frame portions extending inwardly beneath said body to support the latter in load carrying position, and pivotal connections between the inner ends of said sub-frame portions and the chassis.

3. In a road vehicle having a load carrying body mounted thereon for pivotal movement about one end thereof into a load receiving and discharging position which is substantially normal to the adjacent roadway supporting the vehicle, in combination, a vehicle chassis, a load carrying body supported by said chassis and having a portion extending rearwardly of the rear end of said chassis, a member connected with said chassis adjacent each side thereof inwardly of the rear end of the chassis and depending below said chassis for vertical movement relative thereto, said rearwardly extending body portion having a pair of transversely spaced members rigidly connected to said body portion and depending from the end thereof in overlapping spaced relation to the rear end of said chassis, each said depending body members having an integral forwardly extending portion disposed below said chassis and in overlapping relation with one of said depending members connected with said chassis, a pivotal connection between each said overlapping depending body and chassis members, and means for imparting tilting movement to the body about said pivotal connection.

4. The vehicle as defined in claim 3 wherein each said depending body member has a member pivotally mounted on the forwardly extending portion thereof and depending therefrom adjacent the pivotal support for said tilting body, said latter pivotally mounted depending member having an arcuate bottom face disposed in spaced relation to the adjacent surface of the roadway when the body is in load carrying position and engageable with the ground beneath said body pivotal support as the body moves into fully tilted position.

5. The vehicle as defined in claim 4 wherein a sub-frame is disposed between said body and chassis, said sub-frame being supported upon the chassis having its inner end disposed adjacent the inner end of said body, a pivotal connection between said inner end of the sub-frame and the adjacent portion of the chassis, the said member connected with said chassis and forming a pivotal support for said tilting body being rigidly attached to said sub-frame for vertical movement therewith about the pivotal connection between the sub-frame and said chassis, and said pivotally mounted depending roadway engaging member acts through said pivotally connected body and sub-frame members to selectively raise said sub-frame about its pivotal connection with the under frame in maintaining sufficient clearance between the pivotal support for the tilting body and the adjacent ground during movement of the body into a fully tilted position normal to said roadway surface.

6. The vehicle as defined in claim 5 wherein a body tilting mechanism is mounted on said sub-frame for movement longitudinally thereof and has a pivotal connection to said body.

7. In a vehicle having a load receiving body mounted thereon for pivotal movement about one end thereof, in combination, a motor vehicle chassis having transversely spaced longitudinally extending frame members, a sub-frame mounted on said chassis and having transversely spaced longitudinally extending members overlying and supported by said longitudinally chassis members, one end of each said sub-frame members terminating adjacent the rear end of the chassis and extending forwardly therefrom to support a vehicle body, a pivotal connection between the forward end of each said sub-frame member and a portion of the adjacent chassis member, a member rigidly connected to each said sub-frame members adjacent the rear ends thereof and depending therefrom below said corresponding chassis member, said depending members limiting transverse relative movement between said chassis and sub-frame members, a load receiving body overlying said sub-frame and having transversely spaced longitudinally extending base members aligned with and resting upon said sub-frame longitudinally extending members, said body longitudinal members extending rearwardly beyond said sub-frame and chassis members, a member rigidly connected with each said body longitudinal member rearward extension and depending therefrom below the said chassis longitudinal members outwardly of the rear ends thereof, each said body depending member having an inwardly extending portion overlapping the adjacent said sub-frame depending member, a member pivotally connecting said latter overlapping member forming a body tilting trunnion, and means on the vehicle for tilting said body about said pivotal connection between the depending body and sub-frame members.

8. The vehicle as defined in claim 7 wherein said tilting body is provided with an end wall which is disposed in close proximity to the ground when the body is in fully tilted position, a member pivotally mounted on said inwardly extending depending body member portion adjacent said body tilting trunnion, said latter pivotally mounted member depending below its pivotal connection with said body member during tilting of the body and having an arcuate bottom face adapted to engage the ground below said body trunnion to form with its associated body member and the trunnion a compression member maintaining the body trunnion a fixed minimum distance above the ground surface engaged by said arcuate bottom face.

9. The vehicle as defined in claim 8 wherein said body tilting means comprises a member mounted on said sub-frame and having controlled reciprocal movement longitudinally thereof and a dipper stick having one end pivotally connected to said reciprocating member and the opposite end pivotally connected to said body.

10. The vehicle as defined in claim 9, wherein a second pair of longitudinally disposed transversely spaced members are disposed between and supported upon said first-named longitudinally extending pivotally mounted sub-frame members, said reciprocating member comprises a trolley member having wheels at opposite sides thereof engaging the adjacent said second pair of sub-frame members, said trolley member having a pair of spaced rotatable sheave wheels mounted thereon and spaced in a direction longitudinally of said second pair of sub-frame members, a rotatable sheave wheel mounted between said second pair of sub-frame members adjacent each end thereof, a winch mounted on said chassis beneath said sub-frame and a pair of cables each having one end connected with the winch and the opposite ends reeved through the sheaves at one end of the sub-frame assembly and the adjacent sheaves of the trolley, the free ends of the cables being secured to the sub-frame for imparting controlled reciprocal movement to the trolley as the winch is rotated in opposite directions.

References Cited in the file of this patent

UNITED STATES PATENTS

| | | |
|---|---|---|
| 365,233 | Blake | June 21, 1887 |
| 561,398 | Hill | June 2, 1896 |
| 661,878 | Kiely | Nov. 13, 1900 |
| 671,290 | Muller | Apr. 2, 1901 |
| 728,207 | Currie et al. | May 19, 1903 |
| 880,733 | Hayes | Mar. 3, 1908 |
| 1,245,560 | Bowen | Nov. 6, 1917 |
| 1,267,952 | Wolfe et al. | May 28, 1918 |
| 1,429,004 | Wick | Sept. 22, 1922 |
| 1,496,398 | Wienholtz | June 3, 1924 |
| 2,189,052 | Anthony | Feb. 6, 1940 |
| 2,308,648 | De Vry et al. | Jan. 19, 1943 |
| 2,542,425 | Oliver | Feb. 20, 1951 |
| 2,549,166 | Brandt | Apr. 17, 1951 |
| 2,726,115 | Babcock et al. | Dec. 6, 1955 |

FOREIGN PATENTS

| | | |
|---|---|---|
| 696,609 | France | Oct. 14, 1930 |
| 528,365 | France | Aug. 12, 1921 |
| 555,280 | France | Mar. 19, 1923 |